US 6,748,588 B1

(12) United States Patent
Fraser et al.

(10) Patent No.: US 6,748,588 B1
(45) Date of Patent: Jun. 8, 2004

(54) ONE-PASS GREEDY-PATTERN-MATCHING FINITE-STATE-MACHINE CODE GENERATION

(75) Inventors: Christopher W. Fraser, Seattle, WA (US); Todd A. Proebsting, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/282,780

(22) Filed: Mar. 31, 1999

(51) Int. Cl.$^7$ .................................................. G06F 9/45
(52) U.S. Cl. ...................... 717/146; 717/143; 717/148; 717/106; 717/158
(58) Field of Search .................................. 717/146, 136, 717/151, 143, 100, 162, 124, 101, 149, 148, 106, 114, 158; 706/48, 47; 703/2, 22; 716/3; 711/100

(56) References Cited

U.S. PATENT DOCUMENTS

| | | | | |
|---|---|---|---|---|
| 5,394,347 A | * | 2/1995 | Kita et al. ....................... | 703/2 |
| 5,671,416 A | * | 9/1997 | Elson .......................... | 717/106 |
| 5,752,038 A | | 5/1998 | Blake et al. .................. | 717/158 |
| 6,011,919 A | * | 1/2000 | Politis et al. ................ | 717/114 |
| 6,035,109 A | * | 3/2000 | Ashar et al. ................... | 716/3 |
| 6,139,199 A | * | 10/2000 | Rodriguez .................. | 717/114 |
| 6,182,024 B1 | * | 1/2001 | Gangopadhyay et al. ..... | 703/22 |
| 6,189,069 B1 | * | 2/2001 | Parkes et al. ................ | 711/100 |
| 6,292,938 B1 | * | 9/2001 | Sarkar et al. ................ | 717/138 |
| 6,324,686 B1 | * | 11/2001 | Komatsu et al. ............ | 717/148 |

OTHER PUBLICATIONS

Proebsting–Whaley, One–pass, Optimal Tree Parsing—With or Without Trees, Sep. 22, 1995, Department of Computer Science, The University of Arizona, Tucson, AZ 85721, TR 95–10.*

Fraser–Proebsting, Finite–State Code Generation, 1999, ACM SIG{/–} PLAN Notices, vol. 34, No. 5, pp. 270–280.*

Fraser, C.W., et al., "A Retargetable C. Compiler: Design and Implementation", *Benjamin/Cummings, Redwood City, California*, (1995).

* cited by examiner

*Primary Examiner*—Antony Nguyen-Ba
(74) *Attorney, Agent, or Firm*—Merchant & Gould P.C.

(57) ABSTRACT

A one-pass, greedy-pattern-matching, finite-state-machine code generator is disclosed. The code generator generates local code (such as processor-native code) from intermediate code (such as Java byte code). In one embodiment of the invention, a computer-implemented method for generating local code from intermediate code first includes receiving a current element of a post-fix-notated intermediate code. The method receives a current element of a postfix-notated intermediate code, and matches the current element to a base rule within a predetermined intermediate code-to-local code grammar. The method then selects and applies a matching base rule based on a predetermined criteria. A local code is then generated according to the matching base rule applied to the current element. A next element of the intermediate code is then advanced to as the current element. In another embodiment, the method matches the current element to a base rule, includes matching a most recent element to one or more chain rule(s) within the grammar and applies the chain rule(s) to the most recent element to enable the current element to match a given base rule. In still another embodiment, a code-generator generator is disclosed that constructs a code generator according to a machine specification.

17 Claims, 6 Drawing Sheets

| | | | |
|---|---|---|---|
| cnsti: | PushConstU4[N] | (0) | emit("N") |
| reg: | cnsti | (1) | emit("loadimm $0, $1") |
| reg: | PushRegU4[N] | (0) | emit("rN") |
| reg: | LoadU4(addr) | (1) | emit("load $0, $1;") |
| reg: | AddU4(reg, reg) | (1) | emit("addi $0, $1, $2;") |
| addr: | AddU4(reg, cnsti) | (0) | emit("$2($1)") |
| addr: | reg | (0) | emit("0($1)") |
| addr: | cnsti | (0) | emit("$1") |

FIG. 2

```
// Token declarations
%term AddU4=1
%term SubU4=2
%term AddF4=1
%term SubF4=2
%term PushConstU4=3
%term PushConstF4=3
%term LoadU4=4
%term LoadF4=4
%term StoreU4=5
%term StoreF4=5
%% // Constructive Grammar
root:   StoreU4(int, int)
root:   StoreF4(float, int)
int:    AddU4(int, int)
int:    SubU4(int, int)
float:  AddF4(flaot, float)
float:  SubU4(float, float)
int:    PushConstU4[4]
float:  PushConstF4[4]
int:    LoadU4(int)
float:  LoadF(int)
%% // Machine Specification Grammar
root:   StoreU4(reg, addr)    { printf("root: StoreU4(reg, addr)") ; }
root:   StoreF4(reg, addr)    { printf("root: StoreF4(reg, addr)") ; }
reg:    AddU4(reg, cnsti)     { printf("reg: AddU4(reg, cnsti)") ; }
reg:    AddU4(reg, reg)       { printf("reg: AddU4(reg, reg) }
reg:    SubU4(reg, cnsti)     { printf("reg: SubU4(reg, cnsti)") ; }
reg:    SubU4(reg, reg)       { printf("reg: SubU4(reg, reg) }
reg:    AddF4(reg, reg)       { printf("reg: AddF4(reg, reg) }
reg:    SubF4(reg, reg)       { printf("reg: SubF4(reg, reg) }
cnsti:  PushConstU4           { printf("cnsti: PushConstU4") ; }
cnstf:  PushConstF4           { printf("cnstf: PushConstF4") ; }
reg:    LoadU4(addr)          { printf("reg: LoadU4(addr)") ; }
reg:    LoadF4(addr)          { printf("reg: LoadF4(addr)") ; }
reg:    cnstf                 { printf("reg: cnstf") ; }
reg:    cnsti                 { printf("reg: cnsti") ; }
addr:   reg                   { printf("addr: reg") ; }
addr:   cnsti                 { printf("addr: cnsti") ; }
%%
// C code here
```

FIG. 6

ONE-PASS GREEDY-PATTERN-MATCHING FINITE-STATE-MACHINE CODE GENERATION

FIELD OF THE INVENTION

This invention relates generally to code generation, such as the generation of native machine code from an intermediate representation, and more particularly to such code generation that is performed in one pass, based on a greedy pattern-matching finite-state-machine scheme.

BACKGROUND OF THE INVENTION

Traditionally, most computer programs have been specific to the type of computer on which they are intended to run, and more'specifically, to the type of processor within the computer. For example, an executable computer program compiled from a source code for the computer program may only execute on x86 processor-based computers, such as Intel Pentium processor-based computers. Generally, this means that software developers may have to recompile their program—and even may have to rewrite some of the source code for their program—if they wish to "port" the program so that it can run on a different processor-based computer.

However, more recently, there has been broader interest in computer languages that are intended to allow a source code for a program to be written and compiled only once, and executed on any type of computer, and by any type of processor. Programs written in these languages run on a "virtual machine," (VM) as opposed to a specific type of machine. Such a computer language, for example, is the Java computer programming language. With these types of computer languages, source code is compiled into an intermediate representation (IR) or VM code or—when the code is a stream of bytes—byte code. For the IR or VM code to be run on a specific computer having a specific type of processor, a program on the computer either interprets IR or VM code directly, or a just-in-time (JIT) translator compiles the IR or VM code to native code on an as-needed basis for subsequent execution. In general, the compiled code runs faster than interpreted code, but takes longer to load and requires more space (e.g., memory). Thus, conventional wisdom dictates that the space/time tradeoff favors the interpreter approach where space is scarce, but favors the JIT compilers when speed is more important than size or simplicity. Interpreters typically give up a factor of 10× in execution speed compared to JIT-translated code.

JIT compilers are examples of a class of computer programs called code generators. Code generators thus take an input, such as an IR or VM code, and based on that input, generate a corresponding output of native code that can be directly run on a given type of processor. Furthermore, another type of computer program is called a code-generator generator, which based on a specific specification or grammar, generates a code generator that can read IR or VM code, for example, according to that specification or grammar, and generate native code. The code-generator generator program may generate a code generator program in a source code such as code written in the C programming language, which must then be compiled by a further compiler to yield an executable program.

With respect to code generators, one type of code generator is referred to as a pattern-matching code generator. Pattern-matching code generators map patterns of intermediate representation operators to equivalent target instructions. More specifically, tree pattern-matching code generators generally use tree patterns and, optionally, target-machine instruction costs to select least-cost (viz., optimal) mappings via dynamic programming, which requires two tree-walk passes: a first bottom-up pass for the dynamic programming, and a second top-down pass for selecting the least-cost match. Other systems heuristically search for better target instructions to emit. In general, however, these types of code generators can be large (viz., they can take up a lot of space in the host machine), and are slow, even if their generated code is generally good (viz., optimal).

Tree-pattern-matching technologies combined with dynamic programming generally yield efficient, optimal local code generation for tree-based intermediate representations. However, all dynamic programming systems require two passes over the intermediate representation: the first pass annotating the tree with dynamic programming information, and the second pass selecting the optimal match. But, while generating optimal code from trees, these code generators do so at the cost of two passes over the intermediate representation, and thus are relatively slow. Furthermore, the second pass usually requires a top-down tree walk of the intermediate representation, which can require transforming the input (the intermediate representation) into a tree data structure. This transformed input is generally larger than the original input, and allocating and initializing the structure can significantly increase the cost of code generation.

Thus, there is a need for faster code generators that-nevertheless generate optimal or near-optimal local (native) code. For this and other reasons, then, there is a need for the present invention.

SUMMARY OF THE INVENTION

The invention relates to one-pass, greedy-pattern-matching, finite-state-machine code generation. In one embodiment of the invention, a computer-implemented method for generating local code from intermediate code first includes receiving a current element (e.g., a current instruction or literal operand) of a postfix-notated intermediate code. The method receives a current element of a postfix-notated intermediate code and matches the current element to a "base rule" within a predetermined grammar for translating intermediate code to local code. The rules that comprise a tree grammar can be partitioned into "base" and "chain" rules. Chain rules match a single non-terminal, but base rules include operators. It can be assumed without loss of generality that each base rule matches a single operator and the non-terminals that were matched by its non-literal operands.

In one embodiment, matching a base rule includes matching a most recent element to a chain rule within the grammar and applying the chain rule to the most recent element to determine whether the current element matches a given base rule. Next, the method selects and applies a matching base rule based on a predetermined criteria, such as using the first matching base rule, or using the least costly matching base rule. A local code is then generated according to the matching base rule applied to the current element. In one embodiment, this includes initially generating a local code according to the chain rule applied to the most recent element. A next element of the intermediate code is then advanced to the current element. In one embodiment, this process is repeated until the current element is past the last element of the intermediate code.

The described embodiment results in generation of local code in only one pass—that is, once the intermediate code has been processed one time, local code has been generated such that it can be executed, without requiring a second pass of the intermediate code prior to generating local code. This process results in faster execution as compared to two-pass code generators. The described embodiment is greedy in its pattern matching in that if a base rule can be applied to the current element, it is according to a predetermined criteria (least costly, or first base rule matched)—thus, the element is not "saved" to determine if a different rule can be applied later on (once subsequent elements are known, for example). The described embodiment is a finite-state machine in that it saves only one state at any given time for application of chain rules, as opposed to theoretically infinite states in a code generator that requires the use of a stack. That is, to determine if a base rule can be applied to a current element, chain rules in one embodiment are examined to determine whether they can be applied to a most recent element (such that a given base rule is then applicable to the current element). The greedy pattern matching and finite state machine aspects of embodiments of the invention also provide for relatively fast code generation.

The invention includes methods, systems, computer-readable media, computers, code generators, and code-generator generators of varying scope. Still other aspects, embodiments, and advantages of the invention will become apparent by reference to the drawings and by review of the detailed description that follows.

BRIEF DESCRIPTION OF THE DRAWINGS

FIG. 2 is a diagram of an illustrative sample grammar of base and chain rules to generate local code from intermediate code;

DETAILED DESCRIPTION OF THE INVENTION

Figure 1:
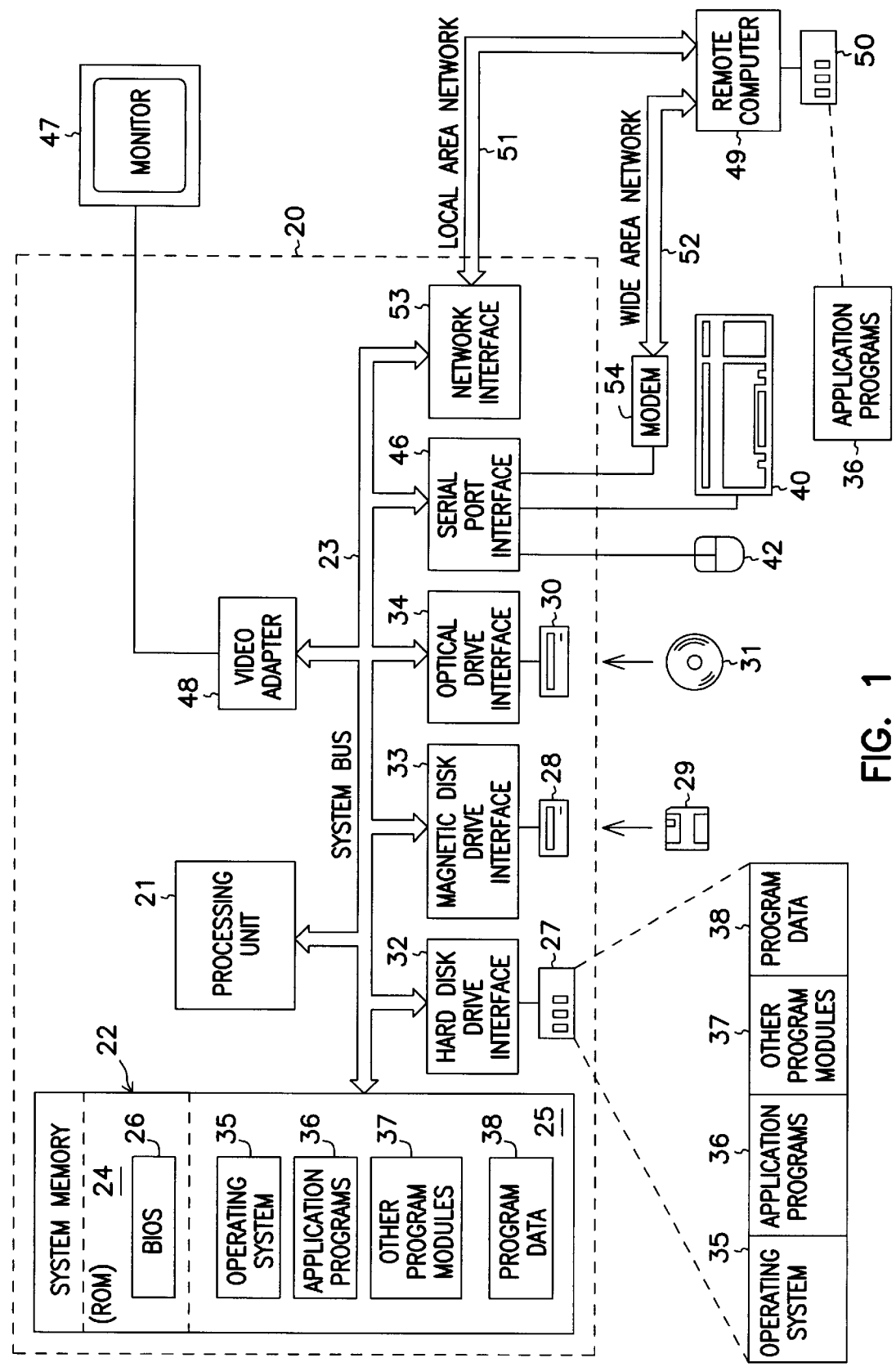
FIG. 1 is a diagram of an operating environment in conjunction with which embodiments of the invention can be practiced.

In the following detailed description of exemplary embodiments of the invention, reference is made to the accompanying drawings, which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The detailed description is divided into sections as follows. First, a description of an operating environment in conjunction with which embodiments of the invention may be practiced is provided. Next, terms and topics central to understanding embodiments of the invention are described, specifically, postfix intermediate code, virtual machine, grammar, greedy pattern matching and finite state machine. Following this, a code generator according to an embodiment of the invention is described (including a method of such a generator, and a system utilizing such a generator), relying on the terms and topics described in the previous section of the detailed description. In the next section, a code-generator generator, to generate a code generator according to an embodiment of the invention, is described. Finally, a conclusion is provided.

Operating Environment

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Terms and Topics

In this section of the detailed description, several terms and topics necessary to understand embodiments of the invention are described, specifically, postfix intermediate code, virtual machine (including a specific "lean virtual machine" utilized in some embodiments of the invention), grammar, greedy pattern matching, and finite state machine.

Postfix Intermediate Code

At least some embodiments of the invention utilize a notation for intermediate code known within the art as postfix notation. A computer program, for example, generally is first written in a source code format, which is a human-language representation of the program understandable for reading and analysis by software developers. For embodiments of the invention, a compiler or other software development tool then generally compiles or otherwise translates the source code (or, source data) of the program into a form known as intermediate code. The intermediate code is a non-processor-specific version of the computer program, which can then be translated, interpreted, or compiled into a machine code (also known as local code or native code) version of the program executable on a specific processor or machine (for example, within the context of a virtual machine, as is described in the next section of the detailed description). One common type of intermediate code known in the art is Java byte code.

Figure 3:
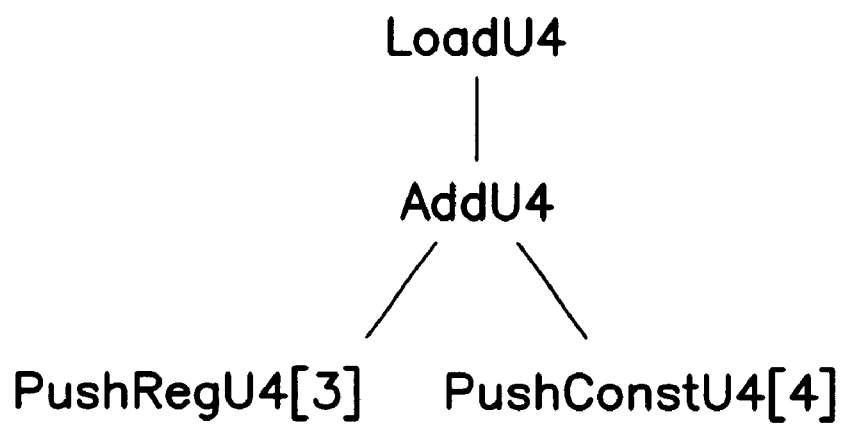
FIG. 3 is a diagram of a tree-based representation of an intermediate code representation.

There are several manners by which the intermediate code can be represented; in at least some embodiments of the invention, a postfix notation is utilized. This is explained by reference to FIG. 3, which is an alternative, tree-notated representation of an exemplary intermediate code. The representation of FIG. 3 is a tree-notated version of the intermediate code load rx, 4(r3). A prefix-notated version of this code can be written as LoadU4(AddU4(PushRegU4[3], PushConstU4[4])). Finally, a postfix-notated version of this code can be written as PushRegU4[3] PushConstU4[4] AddU4 LoadU4.

In other words, a postfix-notated intermediate representation specifies the operands of an operation (or, operative) first, and then lists the operative to be utilized on this operand. Those of ordinary skill within the art can appreciate that this type of notation is comparable to Reverse Polish Notation (RPN) utilized on some scientific calculators, as opposed to a more standard, equation-based notation.

Virtual Machine

The term virtual machine refers to a theoretical machine or computer that is able to directly execute an intermediate code of a computer program. Generally, no such computer actually exists, hence the term "virtual." Rather, for a real computer or machine, such as a RISC processor- or x86 processor-based computer, to execute the intermediate code, the intermediate code must be compiled into a local (also known as native, or machine) code version understandable by the machine being utilized, or the intermediate code must be interpreted by a program running on the machine being utilized.

In at least some embodiments of the invention, this entails usage of a native machine program running on a computer. The native machine program thus includes a code generator in accordance with an embodiment of the invention, which is able to generate local code from the intermediate code, so that the original VM program is rendered executable. It is noted that the code generator itself may have components such as a pattern matcher, for utilization in translating the intermediate code.

For some embodiments of the invention (although the invention is not so limited itself), a virtual machine-referred to as a lean virtual machine (LVM) is utilized—the illustrative grammars used herein, for example, are for use with the LVM. It is noted that other virtual machines can be utilized with embodiments of the invention, including those are known in the art as Java virtual machines.

The LVM is a simple stack-based machine designed to enable efficient translation to target-machine code. The LVM is lean in the sense that the instruction set eliminates nearly all redundant operations. For example, the only addressing mode in the LVM is indirect (viz., loads and stores find their target addresses on the evaluation stack). The LVM includes only two primitive operations for accessing literal values: one pushes a compile-time constant on the stack, and the other pushes a link-time constant on the stack, although these operations can be of different sizes and types. Besides the stack, the LVM includes 256 registers, in one embodiment.

The LVM instruction set desirably does not include any instructions that assume particular source languages, calling conventions, or object models. For instance, the LVM does not include any instructions for passing arguments, checking types, entering monitors, etc. Such operations must be built from the primitive LVM operations. By including all the necessary primitive operations to map any such operations onto a particular target machine, and by avoiding hardwiring a particular language bias into the LVM, it is able to function as a universal target for all source languages.

As can be appreciated by those of ordinary skill within the art, the LVM is described in this section of the detailed description as a point of reference in understanding the grammars provided and described elsewhere in the detailed description. In one embodiment, the LVM is largely based on the 1cc intermediate representation described in Christopher W. Fraser and David R. Hanson, *A Retargetable C Compiler: Design and Implementation*, Benjamin/Cummings, Redwood City, Calif., 1995, which is hereby incorporated by reference. That is, the LVM described in this section is essentially the 1cc trees described in the Fraser and Hanson references, but rather in postfix notation, with C-specific operators expanded into a few more primitive operators and with the operators renamed to be more self-explanatory in their new incarnation as instruction names.

Grammar

Grammars, also referred to as specifications, include the rules by which a code generator according to an embodiment of the invention translates intermediate code to local code. An illustrative sample grammar is shown in FIG. 2. The grammar 200 includes a plurality of rules, such as a plurality of base rules 202 and a plurality of chain rules 204. Each rule associates a nonterminal with a pattern of intermediate code derived from the nonterminal, and with an action that the code generator must execute if this rule is chosen. Each rule is also cost-augmented—that is, each rule includes a relative cost weighting that the code generator may use to choose an optimal (least costly) rule when two or more rules have the same pattern.

As used herein, a terminal is an intermediate language operator, such as AddU4, LoadU4, etc. Thus, a nonterminal is an element that is not an operator, such as an ADDRess (addr), a REGister (reg), a CONSTant (cnsti for a constant integer, and cnstf for a constant floating point, or real, number), etc. Base rules are defined as rules that derive a terminal from a nonterminal. Chain rules are defined as rules that derive one nonterminal from another nonterminal. If a nonterminal, N, derives X, X is said to "generate" N.

Thus, the first base rule of the plurality of base rules 202 in FIG. 2 is a rule such that if the pattern of a terminal of the form PushConstU4[N] is found, a nonterminal cnsti is produced. This rule has a relative cost of zero, meaning that it is less costly to perform than a rule having a relative cost, for example, of 1. The action associated with this rule, emit("N"), produces the native code for the immediate value, N.

As another example, the first chain rule of the plurality of chain rules 204 in FIG. 2 is a rule such that if the pattern of the nonterminal cnsti is found, a nonterminal reg is produced. This rule has a relative cost of one. The local, or native, code generated in conjunction with this rule is "loadimm" via the associated action, emit("loadimm $0, $1").

It is noted that in at least some embodiments of the invention, such as those utilizing the grammar of FIG. 2, all first operands in rules must be reg nonterminals, so the code generator knows to apply the necessary chain rules to reduce the nonterminal to a reg.

One Pass, Greedy Pattern Matching, and Finite State Machine

A code generator according to an embodiment of the invention achieves speed of local code generation by performing only one pass of intermediate code, in a greedy pattern matching and finite-state machine manner. Thus, according to this embodiment of the invention, the code generator forsakes dynamic programming and unrestricted tree matching, as known within the art, for a simpler, faster scheme that matches patterns greedily from a restricted tree-pattern grammar. As has been described, a code generator according to an embodiment of the invention does not traverse trees, but rather reads a postfix intermediate representation.

An example intermediate code is illustrative to understand the one-pass, greedy pattern matching, and finite state machine nature of a code generator according to the invention. The example intermediate code is analyzed against the grammar of FIG. 2 that has already been described; the example intermediate code represents a simple load, PushRegU4[2] PushConstU4[4] AddU4 LoadU4 Thus, on a typical and simple RISC target processor, this may map cleanly into a load instruction: load r?, 4(r2).

A code generator according to an embodiment of the invention first translates the instruction, or element, PushRegU4[2]. It is noted that while there is only one rule that matches, PushRegU4 in the grammar of FIG. 2, it is not necessarily obvious which of the chain rules, if any, should be used. In general, as those of ordinary skill within the art can appreciate, it is impossible to know which chain rules should be applied until subsequent operators are inspected (which is the reason why dynamic programming systems, as has been described, require two passes).

Looking ahead to the next instruction, or element, PushConstU4, assists this determination. Examination of the grammar of FIG. 2 shows that all first operands must be reg nonterminals, as has been described. Note that if looking ahead to the next instruction revealed a LoadU4 instruction, then the addr: reg chain rule would be applied to produce the necessary addr nonterminal.

Thus, the inquiry becomes determining what chain rules should be applied after reducing PushConstU4—i.e., either to cnsti, addr, or reg. Those of ordinary skill within the art can appreciate that the question cannot be answered by looking just one instruction, or element, ahead. The required nonterminal depends on which AddU4 rule should be used, which depends on yet another instruction—the instruction that uses the AddU4's computation. In general, there is no bound on how far ahead the pattern matcher may need to look to determine the best rule or rules to apply.

However, in accordance with an embodiment of the invention, to avoid looking arbitrarily far ahead, a code generator according to an embodiment of the invention greedily matches base rules, and defers applying all chain rules until the very next instruction is examined. Thus, the code generator utilizes greedy pattern matching, in that a base rule is always used if it matches the current instruction (if more than one base rule applies, than the least costly one is utilized, in one embodiment of the invention utilizing a predetermined criteria that so specifies—otherwise, in another embodiment, the first matching base rule is always applied). Furthermore, the code generator is a finite state machine in that only one state is saved at a given time when applying chain rules—the current instruction (state) is saved, and then chain rules are applied when the next instruction is examined. In other words, never is more than one state saved prior to chain rules being applied—thus the bound as to how far ahead the pattern matcher looks is finitely limited to one instruction (that is, one element).

In the example, then, this means that PushConstU4 would be reduced to a cnsti by the only base rule for PushConstU4. Upon encountering the AddU4, the pattern matcher (that is, the part of the code generator that seeks to match patterns) attempts to apply each AddU4 rule, in turn, until one of them matched (with the possible assistance of chain rules for the most recently encountered operand) and then uses that rule. Thus, reg: AddU4(reg, reg) would be used after forcing the application of a chain rule to promote the cnsti from the PushConstU4 into a reg. The AddU4's reg would in turn be promoted to an addr (via a chain rule application) when the matcher hit the LoadU4 instruction.

It is noted that it is not possible for the greedy scheme to use the addr: AddU4(reg, cnsti) rule, which directly creates an addressing mode, for the grammar of FIG. 2, where the predetermined criteria to applying the base rule is to use the first base rule matched (as opposed to applying the least costly base rule). This is because a cnsti can always be converted to a reg and, therefore, anytime the second AddU4 rule is applicable, so is the first, and in the criteria where the first base rule matched is always used.

Some grammars may require deferring chain rules for more than one instruction—for example, adding the rule root: StoreU4(addr, reg). Because addr is the first operand, and other binary operator rules have reg nonterminals as their left operand, it would not be possible to know what chain rules should be applied to a nonterminal that will be used as a left operand without knowing the parent operator. This is referred to as a left-bias problem; deferring such decisions would require a second pass over the input, which embodiments of the invention do not permit.

A solution to this problem for the one-pass nature of embodiments of the invention is to change the StoreU4 instruction in the postfix intermediate representation to take the target address as its right child. For some RISC target processors, this eliminates the left-bias for the translation of a StoreU4; however, this StoreU4 definition does not solve a related code generation difficulty on x86 processors. On x86 processors, it is possible to store an intermediate value into a target location specified by a complex addressing mode. Generating this instructions requires a rule such as root: StoreU4(imm, addr)—however, this cannot be matched in a one-pass code generator Code Generator According to One Embodiment of the Invention In this section of the detailed description, a code generator according to one embodiment of the invention is described. This section utilizes terms and topics that have been defined and explained in the previous section of the detailed description; therefore, for understanding of the code generator described, reference should also be made to the previous section of the detailed description. Furthermore and more specifically, methods to effectuate a code generator, and systems and devices that utilize the code generator, are described in this section of the detailed description.

Method

Figure 4:
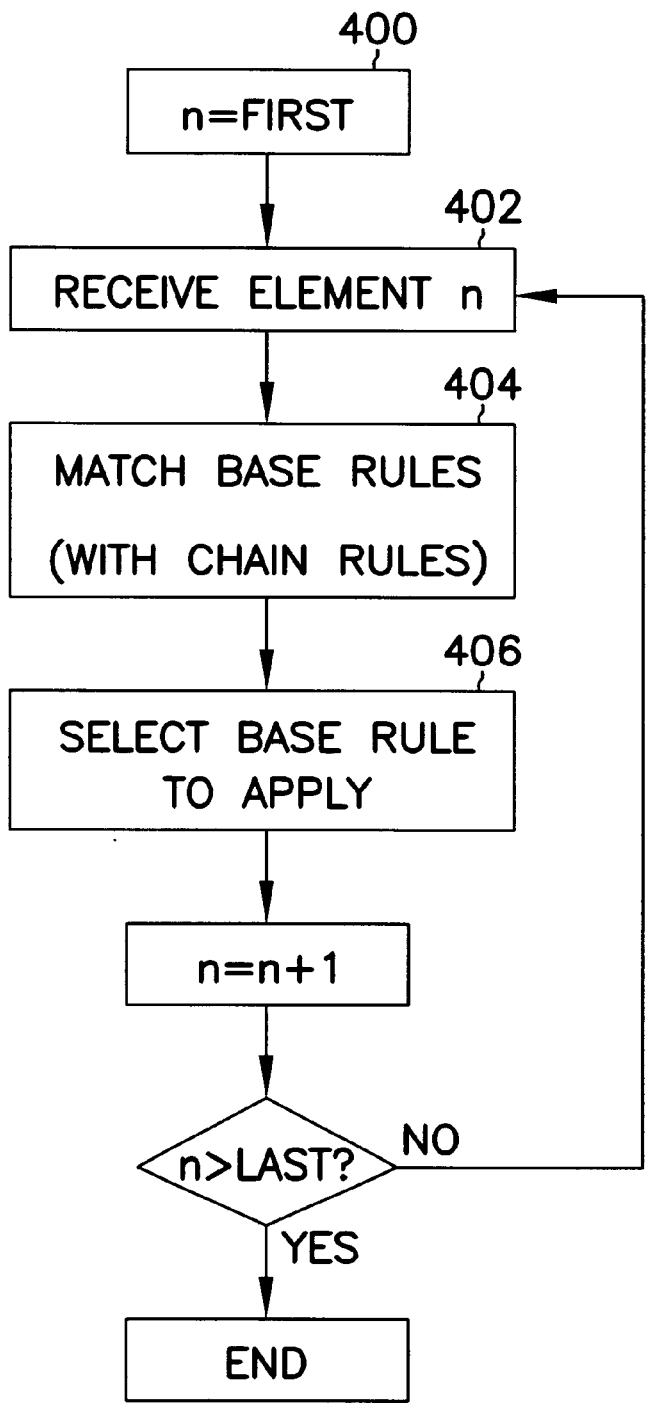
FIG. 4 is a flowchart of a method according to an embodiment of the invention.

A method according to an embodiment of the invention is shown in FIG. 4. The method is a computer-implemented method that generates native, or local, code from a postfix intermediate representation of code. Thus, the method is one embodiment by which a code generator according to the invention can be implemented. Also, the computer-implemented method is desirably realized at least in part as one or more programs running on a computer—that is, as a program executed from a computer-readable medium such as a memory by a processor of a computer. The programs are desirably storable on a machine-readable medium such as a floppy disk or a CD-ROM, for distribution and installation and execution on another computer.

Referring now to FIG. 4, a counter or pointer n is set to the first element of a postfix-notated intermediate code. An element of this code is defined as a discrete part of the code, such as an instruction, operand, or operator of the code. In this embodiment of the invention, each element is examined in turn. Thus, the intermediate code includes a plurality of elements.

In 400, n is initialized to reference the first element. In 402, then, the nth element is received as the current element. By receiving the nth element, it is meant that the element is input from a postfix intermediate code file stored in memory or on a hard disk drive, for example, or received over a communications device (e.g., a modem, or a network interface card, etc.) from the Internet, etc. The invention is not so limited.

In 404, the current element is matched to a base rule within a predetermined intermediate code-to-local (native) code grammar. In one embodiment, this includes matching a most recent element (i.e., the element immediately before the current element) to a chain rule within the grammar, and applying the chain rule to the most recent element to determine whether the current element matches a base rule. That is, in some instances, a given base rule may not match the current rule, without the previous element—most typically being a nonterminal—being translated to a different type of nonterminal, for example, from reg to consti, etc. The predetermined grammar can be any type of tree grammar, such as that which has been described already in a previous section of the detailed description.

In 406, a matching base rule is selected and applied to the current element, based on a predetermined criteria. The invention is not limited to a given predetermined criteria. In one embodiment, the criteria is to choose the first base rule that matches in 404—in such an embodiment, then, as soon as a base rule matches the current element, the method immediately proceeds from 404 to 406 without checking any of the other base rules. In another embodiment, the criteria is to choose the least costly base rule, from a time and/or space perspective, where the grammar utilized includes for each rule a cost weighting. It is noted that 404 and 406 can be interchanged in one embodiment; that is, 406 being performed prior to 404. As part of 406, a local code is generated according to the matching base rule applied to the current element. In one embodiment, this includes also initially generating a local code according to the chain rule applied to the most recent element, if necessary (that is, if it was necessary to apply a chain rule to the most recent element in order to apply a base rule to the current element).

In 408, the counter n is increased by one, signifying that a next element within the intermediate code is advanced to as the current element. If there is no next element (indicating that the most recent element analyzed in 404 and 406), then the counter n will go past the last element, such that the method proceeds from 410 to 412, where the method ends. Otherwise, the process continues back from 410 to 402, where the process starts again on a new current element. That is, the process is repeated until the current element is past a last element of the intermediate code.

System

Figure 5:
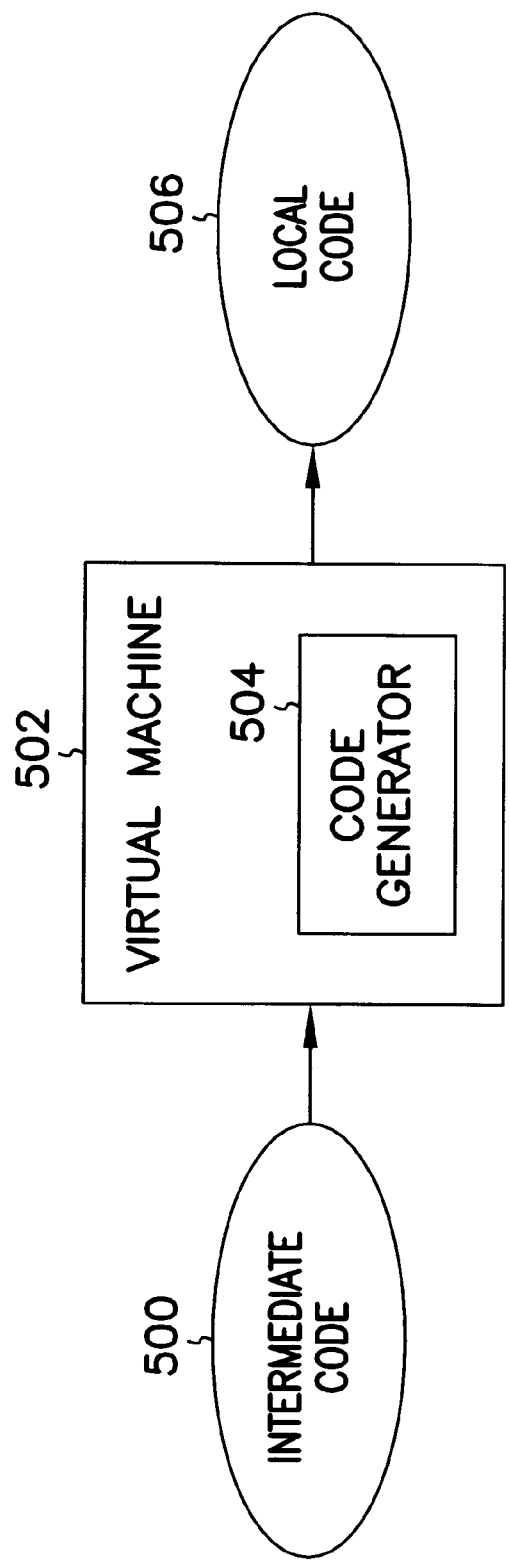
FIG. 5 is a diagram of a system according to one embodiment of the invention; and, FIG. 6 is a diagram of a grammar that can be input into a code-generator generator according to an embodiment of the invention, where the grammar would echo its derivation sequence.

Referring next to FIG. 5, a system according to an embodiment of the invention is shown. The system can in one embodiment be a part of a computerized device, such as a computer, although the invention is not so limited. In such an embodiment, however, the device would include a processor and a computer-readable medium (such as a memory or a hard drive), which is not shown in FIG. 5. However, the processor and medium is referred to herein in the description of the embodiment of FIG. 5. The intermediate code 500 is a postfix-notation intermediate code, as previously described. In one embodiment, the code 500 is stored as data on the computer-readable medium. The virtual machine 502 includes a code generator 504 (which can include, for example, a pattern matcher), to generate the local code 506 from the intermediate code 500. The virtual machine in one embodiment is a computer program executed by the processor from the computer-readable medium; likewise, in one embodiment, the local code 506 is stored as data on the medium, as is native to the processor of the embodiment. Thus, in one embodiment, the code generator 504 and any of its inclusive components (such as the pattern matcher) is a software or computer program, although the invention is not so limited.

The code generator 504 generates the local code 506 from the intermediate code 500, based on application of base rules and chain rules within a predetermined grammar, according to a predetermined criteria. Desirably, this generation is accomplished in one pass of the intermediate code, and in a greedy-pattern-matching and finite-state-machine manner, such as has been already described in this application. Also, in one embodiment, the generation is accomplished pursuant to the method of FIG. 4, as has already been described.

Code-Generator Generator

In this section of the detailed description, a code-generator generator according to an embodiment of the invention is described. This generator generates code generators according to embodiments of the invention, as have been described. More specifically, the generator performs analysis of an input grammar (e.g., machine specifications) to produce a code generator in C. The code-generator generator is described in conjunction with the following sub-sections: machine specifications, generating matchers, finite state machine, switch statement, operator propagation, chain rule inlining, and equivalence classes.

Machine Specifications

The specifications (input grammar) for the generator in accordance with one embodiment of the invention include token declarations, constructive grammar, machine grammar, and auxiliary C routines. The token declarations are for all operators in the grammar, including their external encoding in one embodiment, all encodings are no greater than eight bits.

The constructive grammar describes all legal tree derivations. The code-generator generator eliminates some case analysis in its pattern matcher when the constructive grammar is more constrained than the machine specification grammar. The constructive grammar also indicates how many bytes of immediate value follow the operator in an instruction stream (e.g., PushConstU4[4]).

The machine grammar is a set of parsing rules annotated with actions encoded in C. A rule includes a left-hand side terminal, a pattern, and an action. The rules take two possible forms: a chain rule that has a nonterminal as its pattern, or a base rule that has a tree pattern—a terminal for the operator, and nonterminals as children. The matcher executes an action when it selects the associated rule.

Finally, the machine specifications may include arbitrary C code that compiles and links with the generated matcher. In one embodiment, the code-generator generator emits a single C function, compile( ), that takes as an argument an array of postfix code to be matched.

Thus, those of ordinary skill within the art can appreciate that the code-generator generator can be accomplished in accordance with an embodiment of the invention. Namely, a method that first receives an input grammar including token declarations, constructive grammar, and machine grammar, and next generates a compile function having as an argument an array of postfix code to be matched, the compile function representing a one-pass, greedy-pattern-matching, finite-state-machine code generator.

Furthermore, the method is desirably realized at least in part as one or more programs running on a computer—that is, as a program executed from a computer-readable medium such as a memory by a processor of a computer. The programs are desirably storable on a machine-readable medium such as a floppy disk or a CD-ROM, for distribution and installation and execution on another computer.

Generating Matchers

The code-generator generator creates matchers that read stack-based input and perform actions before and after each operator; it is noted that the description provided in this sub-section is also applicable to a code generator according to an embodiment of the invention, as has been described. Before performing the appropriate action associated with the operator, it may be necessary to apply chain rule actions by the preceding nonterminal to enable a match. To provide a one-pass matcher, chain rules are only applied to the nonterminal produced by the immediately preceding operator. For instance, if the preceding operator produced a reg, and the next operator is a LoadU4, the rule addr: reg desirably must be applied before applying the LoadU4 rule. It is noted that an asymmetry exists: chain rules are always applied to the nonterminal generated by the preceding operator, whereas base rules are desirably always applied to the current operator.

As has been described, the matchers desirably never apply chain rules to nonterminals other than those generated by the preceding operator. When a unary or binary operator is encountered, it is then relatively simple to determine which chain rule or rules to apply—use the chain rules necessary to get the appropriate nonterminal for a match. If more than one base rule exists for an operator, use the first rule that can be applied, even if it requires application of chain rules (this is in one embodiment only; the invention is not so limited). Thus, this is a greedy matcher.

When a nullary operator (a leaf operator in the tree) is encountered, the chain rules that should be applied to the previous nonterminal, if one exists, are determined by analysis of the grammar. For example, in the grammar of FIG. 6, nullary operators will cause application of chain rules to derive the reg nonterminal. The code generator generator determines this by noting that all left-child nonterminals in the grammar are regs, and, therefore, any matches must match this previous value as a reg. This follows from the observation that in a stack machine, all values below the top of the stack are consumed only by binary operators. The code-generator generator allows more than one nonterminal to appear as the left child of various binary operator, but the generator's analysis in one embodiment desirably must prove that this presents no ambiguity during a match.

Finite State Machine

It is noted that the description provided in this sub-section is also applicable to a code generator according to an embodiment of the invention, as has been described. Because only the immediately preceding nonterminal can affect the pattern matching process, only that nonterminal needs to be remembered during matches. Pattern matching is determined by this single nonterminal and the current operator (i.e., both elements). This defines a finite-state machine in which the last nonterminal is the state, and the current operator is the input symbol. Each state corresponds to a nonterminal in the machine specification grammar. Thus, the machine for the grammar of FIG. 6 would have five states: root, reg, cnsti, cnstf, and addr.

The state machine in code is in one embodiment a mechanism for performing the appropriate actions, in accordance with the grammar rules, and making the appropriate state transitions. It is noted that for a given transition there are zero or more chain rules applied to the preceding nonterminal (state), and exactly one base rule applied.

Determining which rules should be applied for a given (nonterminal element, operator element) pair is done as follows. The code-generator generator determines which base rule to apply by greedily trying them in order, in one embodiment of the invention, allowing as many chain rules as necessary to be applied to make a match work. Thus, this is greedy with respect to base rules, not chain rules. Given alternative sequences of chain rules to do the same conversion, in one embodiment the shortest is chosen, breaking ties arbitrarily.

In one embodiment, the schemes utilized by the code generators generated use a hard-coded matcher, rather than an interpretive, table-driven matcher. The hard-coded matchers that are generated desirably avoid any explicit storage of the last nonterminal by generating different code for each state to handle the operations of each state.

Switch Statement

In one embodiment, the code-generator generator is such that each nonterminal translates to code for handling an operator after a reduction to that nonterminal. C's switch statement is used to choose actions given the possible operators. Application of any rule causes execution of the associated action, and a transfer to the code corresponding to the left-hand side nonterminal of the rule (viz., a state transition). Applying a base rule also advances to the next operator. (It is noted that there are other manners by which to accomplish this, besides using switch statements, but those of ordinary skill within the art can appreciate that using switch statements is an efficient, albeit not exclusive, manner.)

Operator Propagation

A drawback to this utilization of switch statements is that a given operator may flow through many such statements—in fact, it can execute one switch statement per rule (chain and base) that it forces. This inefficiency is eliminated in one embodiment by taking advantage of the fact that after the first switch statement, it is known exactly which case arm of the subsequent switch statements will be executed. Therefore, control is transferred out of each switch statement directly into the appropriate case arm of the next appropriate switch statement. For example, given state reg and operator LoadU4, it must be the case that after applying chain rule addr: reg (in the grammar of FIG. 6) that the rule reg: LoadU4(addr) is to be applied—so it can be jumped to directly. Thus, after this type of optimization, only the first rule applied for a given terminal transfers control through a switch statement.

Chain Rule Inlining

Furthermore, it is possible to take the optimization of the previous sub-section a step further and eliminate the intermediate control transfer altogether. By inlining—in possibly many locations—chain rules, it is possible to in one embodiment guarantee exactly one control transfer per operator, regardless of the number of applied chain rules. The price of this transformation, however, is that the size of the code generator increases.

Equivalence Classes

Finally, in one embodiment, a code-generator generator supports a rudimentary macro-like facility to enable another optimization. That is, the generator can group operators that have identical rule and action templates. For example, AddU4 and SubU4 are nearly identical in the grammar of FIG. 6, such that the generator supports a grammar of the following form:

[AddU4:123 SubU4:456]

reg: $1(reg,reg){printf("%d",$2);}

This is shorthand for writing rules for each of the operators. $1 is shorthand for the operators in the equivalence class (the left-hand side of the macro definitions), and $2 is shorthand for the right-hand side of each definition. The code-generator generator restricts macro definitions to be integers in one embodiment. Macros make for more concise specifications (grammars), and they provide the generator with another optimization opportunity. That is, the generator is able to create matchers that operate on operator equivalence classes rather than individual operators. Thus, each equivalence class has a case arm rather than each operator.

However, this requires that the associated rules be parameterized by the macro substitutions, as those of ordinary skill within the art can appreciate. But for an extra level of indirection, equivalence classes provide a simple technique for decreasing the size of the specification and the matcher of the code generator.

Conclusion

A finite-state-machine, greedy-pattern-matching, one-pass code generator has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

We claim:

1. A computer-implemented method for generating local code from intermediate code comprising:

receiving a current element of a postfix-notation intermediate code;

matching a most recent element to one or more chain rule(s) within a predetermined intermediate code-to-local code grammar and applying the chain rule(s) to the most recent element to enable the current element to match a given base rule within the predetermined intermediate code-to-local code grammar;

selecting and applying the matching base rule based on a predetermined criterion;

generating a local code according to the base rule applied to the current element; and advancing to a next element of the intermediate code as the current element.

2. The method of claim 1, wherein generating a local code according to the matching base rule applied to the current element comprises initially generating a local code according to the chain rule applied to the most recent element.

3. The method of claim 1, further comprising repeating until the current element is past a last element of the intermediate code.

4. The method of claim 1, further initially comprising setting a first element of the intermediate code as the current element.

5. The method of claim 1, wherein the predetermined criterion comprises selecting a least costly matching base rule.

6. The method of claim 1, wherein the predetermined criterion comprises selecting a first-matched matching base rule.

7. The method of claim 1, wherein the intermediate code comprises a Java byte code.

8. The method of claim 1, wherein the local code comprises an x86-native code.

9. A computerized system comprising:

an intermediate code wherein the intermediate code comprises a plurality of elements in a postfix-notated intermediate code;

a local code; and, a code generator to generate within one pass of the intermediate code and in a greedy-pattern-matching nature and a finite-state-machine manner, the local code from the intermediate code based on application of base rules and chain rules within a predetermined grammar and wherein the code generator generates the local code from the intermediate code in the greedy-pattern-matching nature by always applying a base rule to a current element of the intermediate code when the current element matches a base rule.

10. The system of claim 9, further comprising a virtual machine encompassing the code generator.

11. The system of claim 9, wherein the code generator generates the local code from the intermediate code in the finite-state-machine manner by applying a chain rule to at most a most recent element of the intermediate code.

12. A computerized device comprising:

a processor;

a computer-readable medium;

a post-fix-notated intermediate code comprising a plurality of elements stored as data on the medium;

a local code native to the processor stored as data on the medium; and a virtual machine executed by the processor from the medium and including a code generator to generate within one pass of the intermediate code and in a greedy-pattern-matching nature and a finite-state-machine manner, the local code from the intermediate code based on application of base rules and chain rules within a predetermined grammar according to a predetermined criteria and wherein the code generator generates the local code from the intermediate code in the greedy-pattern-matching nature by always applying a base rule to a current element of the intermediate code when the current element matches a base rule.

13. The computerized device of claim 12, wherein the device comprises a computer.

14. The computerized device of claim 12, wherein the code generator generates the local code from the intermediate code in the finite-state-machine manner by applying a chain rule to at most a most recent element.

15. A computer-readable medium having processor instructions stored thereon for execution by a processor to perform a method for generating local code from intermediate code comprising:

setting a first element of the intermediate code as a current element;

receiving the current element of a postfix-notated intermediate code;

matching the current element to a base rule within a predetermined intermediate-code-to-local-code grammar, including matching a most recent element to a chain rule within the grammar and applying the chain rule to the most recent element to determine whether the current element matches a given base rule;

selecting and applying a matching base rule based on a predetermined criteria;

generating a local code according to the matching base rule applied to the current element, including initially generating a local code according to the chain rule applied to the most recent element;

advancing to a next element of the intermediate code as the current element; and, repeating until the current element is past a last element of the intermediate code.

16. A computer-implemented method for generating local code from intermediate code comprising:

receiving a current element of the intermediate code;

matching the current element to a plurality of chain rules within a predetermined intermediate code-to-local code grammar;

receiving a next element of the intermediate code;

matching the next element to a base rule within a predetermined intermediate-code-to-local code grammar;

selecting one of the plurality of matched chain rules for application, based on a dependency indicated by the next element;

applying the selected one of the plurality of chain rules to the current element to perform an action specified by the chain rule; and applying the base rule to the next element to perform an action specified by the base rule, wherein the applying operations result in emission of local code corresponding to the current element and the next element.

17. A computer-readable medium having processor instructions stored thereon for execution by a processor to perform a computer process for generating local code from intermediate code, the computer process comprising:

receiving a current element of the intermediate code;

matching the current element to a plurality of chain rules within a predetermined intermediate code-to-local code grammar;

receiving a next element of the intermediate code;

matching the next element to a base rule within a predetermined intermediate-code-to-local code grammar;

selecting one of the plurality of matched chain rules for application, based on a dependency indicated by the next element;

applying the selected one of the plurality of chain rules to the current element to perform an action specified by the chain rule; and applying the base rule to the next element to perform an action specified by the base rule, wherein the applying operations result in emission of local code corresponding to the current element and the next element.

* * * * *